United States Patent [19]

Graham et al.

[11] 4,455,358
[45] Jun. 19, 1984

[54] ELECTROCHEMICAL CELLS HAVING A GELLED ANODE-ELECTROLYTE MIXTURE

[75] Inventors: Teresita O. Graham, Dobbs Ferry; John T. Goodman, Croton-on-Hudson, both of N.Y.

[73] Assignee: Duracell Inc., Bethel, Conn.

[21] Appl. No.: 106,996

[22] Filed: Dec. 26, 1979

[51] Int. Cl.$^3$ .............................................. H01M 6/22
[52] U.S. Cl. .................................. 429/190; 429/212; 429/215; 429/224; 429/229
[58] Field of Search .............. 429/212, 214, 215, 216, 429/217, 190; 252/315–317; 260/17.4 R, 17.4 GC, 17.4 ST, 17.4 CL

[56] References Cited

U.S. PATENT DOCUMENTS

| 2,593,893 | 4/1952 | King | 429/190 X |
| 2,993,947 | 7/1961 | Leger | 429/190 X |
| 3,265,632 | 8/1966 | Leach | 429/190 |
| 3,697,327 | 10/1972 | Croissant et al. | 429/190 |
| 3,871,918 | 3/1975 | Viescou | 429/190 |

FOREIGN PATENT DOCUMENTS 54-50830  4/1979  Japan.
54-45746  4/1979  Japan.

Primary Examiner—Charles F. LeFevour
Attorney, Agent, or Firm—Ronald S. Cornell; Israel Nissenbaum

[57] ABSTRACT

An electrochemical cell having an anode, a cathode and an aqueous alkaline electrolyte solution. The anode is an intimate gelled mixture of a powdered metal, an aqueous electrolyte solution and an agent capable of gelling the mixture. The agent is a material capable of absorbing water and having a carbohydrate backbone which has a water soluble side chain grafted thereon. A preferred agent is a water insoluble salt of an aqueous alkali saponified gelatinized starch having a water soluble side chain grafted thereon. The gelling of the intimate mixture of the powdered metal anode and electrolyte solution with the agent is a method of improving the discharge characteristics of the cell.

20 Claims, No Drawings

ELECTROCHEMICAL CELLS HAVING A GELLED ANODE-ELECTROLYTE MIXTURE

FIELD OF THE INVENTION

The present invention relates to gelled anode-electrolyte mixtures for electrochemical cells and more particularly to mixtures gelled through the use of agents which have carbohydrate backbones with water soluble side chains grafted thereon.

BACKGROUND OF THE INVENTION

A thickened or gelled electrolyte is less likely to leak out from an electrochemical cell. Many materials are used as thickening or gelling agents. Such agents include soluble thickeners, insoluble absorbents such as starch, various cellulose type materials such as methyl cellulose and some synthetic polymers.

A recurring problem with agents used heretofore has been that on standing or during cell discharge, liquid separated from many of the thickened solutions or gels. The liquid was then in a position to leak out from the cells. Further, during the manufacture of the cells and before the addition of the gels to the cells, without constant agitation of the gels, separation often occurred. This in turn resulted in the inaccurate addition of electrolyte, due to the random ratios of liquid and gel being added to the cells. The inaccurate addition of electrolyte to the cells in many cases produced poor cells.

Increasing the quantity of agent added to the electrolyte sometimes reduced or prevented this separation, but it also decreased the volume and weight of active material in the cells. The greater quantity of gelling agent also generally decreased the ionic conductivity of the electrolyte which in turn increased the internal resistance of the cells.

Another drawback to the use of some known agents is that they were subject to chemical attack by the strong basic electrolyte solutions employed in alkaline type cells or the acid electrolyte employed in other types of cells. Similarly, some agents also attacked or were attacked by the various components of the cell. The decomposition products resulting from these reactions adversely affected the performance of many cells.

In some cells, a thickener was also added to the anode and/or cathode. Generally the thickener was similar to that used for the electrolyte. The electrodes were gelled for many reasons depending on the type of cell involved and the results desired.

THE INVENTION

It has now been discovered that when water-insoluble salts of aqueous alkali saponified material comprising a gelatinized starch backbone having a water soluble side chain grafted thereon and containing gelatinized starch and saponified side chain in molar ratios of from about 1:1 to 1:19, are used as an agent capable of gelling a mixture of powdered anode metal and electrolyte solution, no separation of liquid or metal from the resultant gel occurs on standing or during use. It has also been found that the use of this type of agent unexpectedly increases the practical discharge capacity of the anode while reducing the amount of cell gassing beyond that achieved through the use of previously known agents. Further, the internal resistance of the cell is not adversely increased.

Other similar agents capable of gelling an intimate mixture of a powdered anode metal and an aqueous electrolyte solution, which include various materials capable of absorbing water are also within the broad scope of the present invention. These materials comprise a carbohydrate backbone having a water soluble side chain grafted thereon. The less preferred agents described herein possess one or more of the desired characteristics of the preferred agents, and all act in a manner to successfully gel the mixture of anode metal and electrolyte solution. The effective electrical discharge characteristics of the cell can also be increased by these agents. Of the many carbohydrates which can be used as the backbone for the various agents of the invention, gelatinized starch is preferred.

DESCRIPTION OF THE PREFERRED EMBODIMENT

The preferred agents of the present invention are water-insoluble salts of aqueous alkali saponified material comprising a gelatinized starch backbone having at least one water soluble side chain grafted thereon. The gelatinized starch and saponified side chains are preferably in molar ratios of from about 1:1 to 1:19. These grafted gelatinized starch materials have the ability to absorb or gel a great quantity, up to more than 1,000 times their own weight, of water. A detailed description and various methods of manufacture of two such preferred agents, having a grafted acrylonitrile or methacrylonitrile side chain are found in U.S. Pat. Nos. 3,935,099, 3,981,100 and 3,997,484 (all Weaver et al.), the entire disclosures of all of which are incorporated herein by reference. Other similar gelling agents are disclosed in U.S. Pat. No. 3,661,815 (Smith). Similar ungelatinized carbohydrate backbone agents are disclosed in U.S. Pat. No. 3,425,971 (Gugliemelli et al.). These further references are also incorporated herein by reference.

Generally the preferred agents of the present invention can be made by the method disclosed by Weaver et al. The method includes first solublizing the starch and then grafting thereon a water soluble side chain using a polymerization initiator such as the ceric ammonium nitrate-nitric acid system. Saponification of the resultant grafted side chain with a hydroxide of an alkali metal yields a soluble product, which can be converted into the absorbent form of the polymer by drying it.

In the processes heretofore practiced of forming the preferred agents, the agents are obtained in the form of an alkaline material which is thereafter treated with acid in order to change them into a form less irritating to human skin. A non-irritating form was preferred since the preferred agents in many of its prior uses came into contact with human skin.

In the present invention the untreated form is preferred. The acid form of the agents when used with alkaline electrolyte solutions, produces gels having a quantity of small bubbles entrapped therein which are difficult to separate from the gels. Use of the untreated form, although causing bubbles, is acceptable because the bubbles have not been found to adversely affect the cell. The bubbles are mainly undesirable in that they contain gaseous ammonia. If produced in large quantities the ammonia must be removed upon generation to avoid harm to workers and equipment. Further, it must be removed in such a manner that it will not harm the environment outside of the manufacturing plant.

It has now been discovered that the ammonia is generated by the reaction of the alkaline electrolyte with ammonium chloride impurities found in the preferred gelling agents. The ammonium chloride is apparently introduced into the agents by the reaction of an acidifying material (usually hydrochloric acid) and ammonia which is associated with the agents produced by the preferred method of Weaver et al. The presence of ammonia is apparently due to its production during the saponification of an intermediate of the agents.

The purification procedure of Weaver et al., used in the commercial manufacture of the preferred agents does not appear to be capable of adequately removing the ammonium chloride. It has been found that when the agents are not acidified, the ammonia produced during saponification can adequately be removed by the washing procedure.

Another advantage of not acidifying the preferred gelling agents is that no new ions are introduced into the cell. Chloride ions present in hydrochloric acid, are known to have a detrimental effect on the performance, stability and shelf life of the cell if present in sufficient concentration. Chloride ions can cause gas to be produced within the cell which in turn causes the cell to vent and the seals to fail, producing electrolyte leakage.

The gelling agents of the present invention are preferably used with electrochemical cells having an aqueous electrolyte solution, an anode and a cathode. The anode comprises an intimate gelled mixture of a powdered metal, an aqueous electrolyte and the agents of the present invention. The preferred agents, upon being mixed with electrolyte solution, absorb the electrolyte solution and form a gel which is not only in intimate contact with the anode metal but also holds the anode metal in suspension.

When the gel is formed outside of the cell, the preferred agents and anode metal can be added to the electrolyte or the electrolyte can be added to the anode metal and preferred agents. Either method produces an acceptable gel for subsequent addition to the cell.

Alternatively, the gel can be formed in situ, wherein the cathode is assembled into the cell, the electrolyte solution is added and then an intimate mixture of the powdered metal and agents of the present invention is added. The agents of the present invention absorb the electrolyte solution present, forming the desired gel.

The properties of the preferred agents are such that the liquid electrolyte does not separate from the gel once it has been formed. For this reason, the gel, before its addition to the electrochemical cell, does not need the constant agitation required of gels formed with previously employed agents. Further, the gel is of such a consistency that the powdered metal does not readily settle out of the gel, either on storage, or after addition to the cell. With gelling agents used heretofore, the gels had a tendency upon standing to separate into liquid and gel portions and the metal would settle out. As mentioned hereinabove, gels made in accordance with the present invention are stable. Accordingly, the use of the preferred agents renders the previously required constant agitation unnecessary.

Gels formed by the preferred agents also possess the property of retaining liquid, even when placed under pressure as during cell crimping or cell storage. The thickened solutions and many gels produced by previously used agents released liquid when placed under pressure in a sealed cell, placing some electrolyte in a position to leak from the cell. The lack of separation of liquid from the gel during manufacture, storage and use insures that there is no liquid available for leakage out of the cell, thereby reducing both sealing and leakage problems.

Unexpectedly, the use of the preferred agents increases the practical discharge capacity of the anode, which in the presently preferred embodiment is amalgamated zinc. In a preferred cell using amalgamated zinc as the anode metal, a fifteen percent increase in practical anode discharge capacity at high rate is found to occur when the preferred agents are substituted for the previously used cellulose type absorbent and the anode metal powder is mixed and gelled with the electrolyte solution. It is believed that this is a result of the greater space between the individual particles of zinc powder in the gelled anode-electrolyte mixture within the cell as compared to the space between the particles when an equal weight of previously used anode-electrolyte mixture is thickened or gelled using prior known gelling agents. Also, when using the gelling agents of the present invention the anode metal particles become substantially homogeneously suspended in the gelled mixture, they are therefore more fully exposed to the electrolyte, and thus can be more efficiently utilized during discharge.

Anodes from powdered metal made in accordance with previously known procedures have had metal particles which are less exposed to the electrolyte than those in anodes made in accordance with the procedures disclosed and claimed herein. This has resulted in the past in lower total overall utilization of the anode powder. In the present invention the greater exposure of the anode metal particles to the electrolyte results in greater consumption of anode material before the cell discharge voltage falls below acceptable limits. It is believed that these effects produced the noted increases in practical anode discharge capacity.

Many electrochemical cells having an aqueous electrolyte are subject to internal corrosion resulting in the generation of hydrogen gas. Gas generation within the cell is undesirable, it can rupture the casing of the electrochemical cell. Unexpectedly, it has been found that the use of the agents of the present invention significantly reduces the production of gas, especially at elevated temperature storage.

The zinc metal of the preferred anode is amalgamated with mercury to reduce the production of gas within the cell. The use of the agents of the invention which are known to be non-toxic permits a reduction in the quantity of mercury used in the cell without causing an undesirable increase in the level of gassing.

The reduction in the amount of mercury required in the cells results in a reduction in the costs and effort required to keep mercury, a known pollutant, out of the environment. Also due to the high cost of mercury, a reduction in its use effects a reduction in the final cost of the electrochemical cell.

Other advantages of the agents of the present invention include the fact that the agents of the present invention are stable in the battery environment and inert with respect to the components of the cell. Accordingly, there are no undesirable by-products which could reduce the capacity of the cell or cause such unwanted effects as gassing.

The agents of the present invention have the ability to take up much more of the electrolyte solution than previously known agents. The amount of preferred agents used can be very small as compared to other agents. Even a quantity of one of the preferred agents of less than one percent of the final gelled anode weight is effective. With such agents an effective amount may constitute as little as 0.3 percent or even less. An effective amount up to about two percent of the final gelled anode weight of preferred agents is the preferred quantity used in the present invention. Other less preferred agents of the present invention may require a larger quantity, for example up to about five percent by weight of the final gelled anode weight. The small quantities of gelling agents required in the present invention results in no significant increase in total weight or in loss of capacity.

The precise quantity of the agents of the present invention required to produce a desired gel will vary, depending upon the quantity and particle size of the powdered anode material, and the volume and concentration of the electrolyte. Necessary quantities of agents can be readily determined by one skilled in the art, based upon the disclosure herein.

The agents of the present invention have a carbohydrate backbone with water soluble side chain grafted thereon. The invention depends largely on the formation of an acceptable gel of the type formed by the preferred agents.

The carbohydrate backbone can be any one of the carbohydrates well known in the art. Examples of classes of useful carbohydrates include monosaccharides, disaccharides, trisaccharides and polysaccharides. Starch, which can be derived from rice, potato, corn, sweet potato, wheat, sago or tapioca is the preferred carbohydrate. Starch has the general chemical formula $(C_6H_{10}O_5)_n$, wherein n will vary depending upon the source of the starch and can vary from several hundred to several thousand.

The gelatinized form of starch, which results from heating starch in water, is the most preferred backbone. Gelatinized starch is a colloidal solution containing $\beta$-amylose and amylopectin ($\gamma$-amylose). The two components of gelatinized starch also have the general formula $(C_6H_{10}O_5)_n$, wherein n is 300-400 for corn starch amylose and about 1200-16,000 for amylopectin. The value for n again will vary depending on the type of starch used.

Water soluble side chains, which are well known in the art and which are preferred, can be grafted onto carbohydrates such as gelatinized or ungelatinized starch and then preferably saponified or ionized. Such molecules have one or more functional groups which makes the molecule water soluble and which functionality is preferably saponified or ionized. Examples of such molecules include acrylonitrile, acrylamide, acrylic acid, methyl methacrylate, acrylic acid ester, vinylacetate, N-vinyl-2 pyrrolidene, salts of alginic acid, gluconic acid and mixtures of these molecules. Acrylonitrile is presently the preferred side chain.

Side chains which can be made water soluble are also useful in the present invention. These side chains have functional groups or a chemical structure which permits them to be made water soluble through a chemical reaction. Such side chains and the necessary solubilizing reactions are well known in the art. Examples of such types of side chains include water insoluble polyesters, polyamides, anhydrides, alcohols and aldehydes.

The side chains of the preferred agents are preferably ionized, having strongly ionized functional groups as carboxylic acid. Ionizing of the side chains, as by hydrolysis, generally improves the gelling properties of the agents. Hydrolysis includes the preferred method of saponification, using alkali hydroxides as disclosed by Weaver et al. Larger quantities of water can be gelled by ionized agents as compared to unionized agents.

Ionizing methods other than hydrolysis include, but are not limited to, forming quaternary ammonium salts, or carboxy methylation. The other methods of ionization, to form the preferred agents, are well known in the chemical arts.

In the preferred agents, the molar ratios of gelatinized starch and side chain can vary widely depending on the side chain employed. When the preferred side chain, acrylonitrile, and many similar side chains are employed, the molar ratio can vary from about 1:1 to about 1:9. The ratio selected will depend on the characteristics desired of the resultant agent.

In the less preferred agents, the molar ratio can vary more widely depending on the backbone used and side chain grafted thereon. These ratios can be easily determined by one skilled in the art.

It is believed that the preferred agents of the present invention are in the form of one massive cross-linked macromolecule. The preferred agents are not discrete molecules as found in many previously used thickeners and gelling agents. It is believed that this chemical structure is responsible for the properties of the gels formed by the preferred agents.

In the present invention, the anode is a gelled mixture of the electrolyte solution and a metal in a particulate or porous form. The metal useful in the anode of the present invention can be any metal generally used in cells having an aqueous electrolyte. Such metals can include aluminum, cadmium, calcium, copper, indium, iron, lead, magnesium, manganese, mercury, nickel, tin, zinc and other metals well known in the art, used either alone or in various combinations. The anode metal can be used in the cell as a powder, granules, an expanded sheet, or any other porous or particulate form.

In the preferred cell, the anode metal comprises powdered amalgamated zinc. Powdered metals provide the largest exposure of anode surface area to the electrolyte. Further, the finer the anode metal powder, the greater the ability of the gel to retain the particles uniformly throughout the gel, which acts to maintain the exposure of the anode metal to the electrolyte. The preferred anode metal powder is of the order of from about 0.03 to 0.9 millimeter in diameter. The most preferred size of powder to be used depends on many factors and it can be readily determined by one skilled in the art.

The electrolyte solutions which can be gelled by the agents of the present invention, include all aqueous electrolyte solutions usable in electrochemical cells. In the preferred embodiments of the present invention alkaline electrolyte solutions are employed. These include, but are not limited to, hydroxides of alkali and alkaline earth metals. Sodium and/or potassium hydroxide are the most commonly used alkaline electrolytes. The agents of the present invention, also being stable towards acids, can be used with acid electrolyte solutions, for example, those employed in the well known zinc-carbon or lead acid battery systems.

The agents of the present invention can be used with all cathodes heretofore useful in aqueous electrochemical cells. These cathodes include, but are not limited to oxidized metals, such as cadmium oxide and hydroxide, mercuric oxide, lead oxide, manganese dioxide, nickel oxide and hydroxide, silver oxide and air.

A separator can be employed in the present invention between the gelled anode-electrolyte mixture, and cathode. Such separators are similar to those well known in the art and used in various aqueous electrochemical cells. Useful separator materials include, but are not limited, to porous cellulose, plastic and glass materials.

The advantages and efficacy of the present invention are illustrated in the following examples. In the examples and claims all percentages, unless otherwise indicated, are by weight.

EXAMPLE 1

A gelled, anode-electrolyte mixture is formed by combining 500 kilograms of amalgamated zinc powder, which is 93 percent zinc and 7 percent mercury, with 10 kilograms of a powdered agent sold under the trademark SGP145* by Henkel Corporation, Minneapolis, Minnesota. To this mixture, 490 kilograms of an aqueous electrolyte solution is added with constant agitation until the mixture is throughly blended and gels. The electrolyte solution comprises an aqueous solution of 35 percent potassium hydroxide and two percent zinc oxide, with the remainder being water. On standing, liquid does not separate out from the gel, nor does the amalgamated zinc settle out.

*Trademark of Henkel Corporation for a gelling agent which comprises a water insoluble salt of an aqueous, alkali saponified, gelatinized starch polyacrylonitrile graft polymer.

A conventional cell can is prepared having a cathode therein of about 40 grams of manganese dioxide, 5 grams of graphite and 5 grams of a 9N potassium hydroxide solution. A conventional cellulose type separator is added. Then 7 milliliters of an aqueous electrolyte solution, comprising about 35 percent by weight of potassium hydroxide and two percent zinc oxide is added. The electrolyte wets the separator and cathode. About 30 grams of the gelled anode-electrolyte mixture is then added in a conventional manner to the cell can and the manufacture of the cell is completed in a conventional manner.

On discharge, the cell exhibits electrical characteristics similar to those cells made with conventional thickeners such as sodium carboxy methyl cellulose. Unexpectedly the cell exhibits a higher discharge capacity of about fifteen percent.

Upon storage of the cell for a period of one to three months at room temperature and at temperatures of 0° C., 45° C., and 75° C., much less hydrogen evolution is evident on storage than with cells not using the SGP 145 agent. It is evident that the reduction in gassing, by as much as a factor of twenty, permits a reduction in the quantity of mercury normally used in the cell to reduce gassing, because with a system less prone to gassing, less mercury would be needed to achieve any desired rate of gassing.

EXAMPLE 2

A cell is made as in Example 1 except that the agent used has not been treated with acid prior to addition to the anode metal. No small bubbles are present in the gel and no ammonia odor is noticeable. On discharge the cell exhibits electrical properties, including discharge capacity, very similar to the cell of Example 1.

EXAMPLE 3

A gelled mixture, as in Example 1, is prepared by combining 490 kilograms of amalgamated zinc anode powder, which is 93 percent zinc and 7 percent mercury, with 40 kilograms of an alkali metal carboxylate salt of a saponified starch polyacrylonitrile grafted copolymer made in accordance with the teachings of U.S. Pat. No. 3,425,971. To the anode mixture, 470 kilograms of the aqueous electrolyte solution of Example 1 is added with constant agitation until the mixture is thoroughly blended.

The resultant gel is similar to and has properties similar to the gel produced in Example 1 but requires more agent to gel the same volume of electrolyte solution used in Example 1. A portion of the resultant gel is used in a cell which is made as in Example 1. On discharge the cell has electrical properties similar to the cell of Example 1.

EXAMPLE 4

A dry mixture is made by combining 500 kilograms of amalgamated zinc powder, which is 93 percent zinc and 7 percent mercury with 10 kilograms of the powdered agent sold under the trademark SGP145 and described in Example 1.

A conventional cell can is prepared having a cathode therein of about 40 grams of manganese dioxide, 5 grams of graphite and 5 grams of a 9N potassium hydroxide solution. A conventional cellulose type separator is added. Then 20 milliliters of an aqueous electrolyte solution, comprising about 35 percent by weight of potassium hydroxide and two percent zinc oxide is added. The electrolyte wets the separator and cathode. About 17 grams of the dry, amalgamated zinc-agent mixture is then added to the cell can, and the manufacture of the cell is completed in a conventional manner.

The powdered agent absorbs the electrolyte solution, forming a gel. On standing, liquid does not separate out from the gel, nor does the amalgamated zinc settle out. The density of the gelled mixture is lower than that of a mixture of similar composition using conventional thickeners.

On discharge, the cell exhibits electrical characteristics similar to those cells made with conventional thickeners such as sodium carboxy methyl cellulose. Unexpectedly, the cell exhibits a higher discharge capacity by about fifteen percent.

Upon storage of the cell for a period of one to three months at room temperature and at temperatures of 0° C., 45° C., and 75° C., much less hydrogen evolution is evident on storage than with prior art cells not using an agent of the type disclosed herein.

EXAMPLE 5

A dry mixture, as in Example 4, is prepared by combining 500 kilograms of amalgamated zinc anode powder, which is 93 percent zinc and 7 percent mercury, with 40 kilograms of an alkali metal carboxylate salt of a saponified starch polyacrylonitrile grafted copolymer. A cell is then constructed as in Example 4.

The cell contains a resultant gel which is similar to and has properties similar to the gel produced in Example 1 but requires more agent to gel the same volume of electrolyte solution used in Example 4. On discharge the cell has electrical properties similar to the cell of Example 4.

EXAMPLES 6-17

Cells are made in accordance with the procedures described in Examples 1 and 4 but using agents having methyl methacrylate, acrylamide, acrylic acid, N-vinyl-2 pyrrolidone, alginic acid, and gluconic acid, respectively, as the side chain grafted onto a gelatinized starch backbone. The grafting is done in a method similar to that shown in the disclosures of Weaver et al. The side chains are ionized in a manner well known in the art. The cells are tested similarly to that in Example 1 and are found to have substantially similar efficacy.

EXAMPLES 18–29

Cells are made in accordance with the procedures described in Examples 1 and 4 using agents having methyl methacrylate, acrylamide, acrylic acid, N-vinyl-2 pyrrolidone, alganic acid, and gluconic acid, respectively, as the side chain grafted onto a starch backbone. The grafting is accomplished in a manner well known in the art. The grafted starch materials are conventionally ionized. The cells are tested similarly to that in Example 1 and are found to have significantly improved discharge capacity when compared to prior art cells.

EXAMPLES 30–65

Cells are made in accordance with the procedures described in Examples 1 and 4 but using aluminum, cadmium, calcium, copper, lead, indium, iron, magnesium, manganese of amalgams of these, respectively, as the powdered metal anode. The cells are tested similarly and are found to have equal or better discharge characteristics than cells which are made using the same metal anodes without the preferred agent.

EXAMPLES 66–77

Cells are made in accordance with the procedures described in Examples 1, 4, and 18 to 29 but in which about 91 grams of silver oxide is used to replace the manganese dioxide in the cathode. The cells are tested similarly and are found to have equal or better discharge characteristics than similar cells which are made using metal anodes without the preferred agent.

EXAMPLES 78–89

Cells are made in accordance with the procedures described in Examples 1, 4, and 18 to 29 but in which about 129 grams of mercuric oxide are used to replace the manganese dioxide in the cathode. The cells are tested similarly and are found to have equal or better discharge characteristics than cells which are made using metal anodes without the agents described herein.

The preceeding examples are for illustrative purposes only. It is understood that variations and changes can be made without departing from the spirit and scope of the present invention as defined in the following claims.

What is claimed is:

1. An electrochemical cell comprising an anode, an aqueous alkaline electrolyte solution, a separator and a cathode, said anode comprising an intimate gelled mixture of a powdered metal, aqueous alkaline electrolyte solution and an agent capable of gelling said mixture, said agent comprising a material capable of absorbing water, said agent comprising a carbohydrate backbone having water soluble side chains grafted thereon.

2. The cell of claim 1 wherein said side chains are ionized.

3. The cell of claim 1 wherein said anode metal comprises zinc.

4. The cell of claim 1 wherein the carbohydrate comprises starch.

5. The cell of claim 1 wherein said side chain is selected from the group consisting of acrylonitrile, acrylamide, acrylic acid, methyl methacrylate, acrylic acid ester, vinylacetate, N-vinyl-2 pyrrolidone, salts of alginic acid, gluconic acid, and mixtures of these.

6. The cell of claim 1 wherein the side chain has been chemically grafted to said carbohydrate.

7. An electrochemical cell comprising an anode, an aqueous alkaline electrolyte solution, a separator, and a cathode, said anode comprising an intimate gelled mixture of powdered metal, aqueous electrolyte solution, and an agent capable of gelling said mixture, said agent comprising a water insoluble salt of an aqueous alkali saponified material comprising a gelatinized starch backbone having water soluble side chains grafted thereon, and containing gelatinized starch and saponified side chain in molar ratios of from about 1:1 to 1:9.

8. The cell of claim 7 wherein said side chain is selected from the group consisting of acrylonitrile, acrylamide, acrylic acid, methyl methacrylate, acrylic acid ester, vinylacetate, N-vinyl-2 pyrrolidone, salts of alginic acid, gluconic acid, and mixtures of these.

9. The cell of claim 8 wherein said side chain comprises acrylonitrile.

10. The cell of claim 7 wherein said electrolyte solution comprises an aqueous solution of a hydroxide having a cation selected from the group consisting of alkali and alkaline earth metals.

11. The cell of claim 7 wherein the water insoluble salt comprises an alkaline salt.

12. A powder-gel anode comprising a major portion of a consumable zinc anodic material, a minor amount of a starch-graft copolymer in which the copolymer contains carboxylate units, and an aqueous alkaline electrolyte solution.

13. The powder-gel anode of claim 12 wherein the consumable zinc anodic material is a powder.

14. The powder-gel anode of claim 13 wherein the starch graft copolymer is present in an amount between about 0.6 and about 11% by weight of the anodic material.

15. The powder-gel anode of claim 14 wherein the starch graft copolymer is present in an amount between about 0.6 and about 4% by weight of the anodic material.

16. The powder-gel anode of claim 12, 13, 14, or 15 wherein the electrolyte solution is aqueous potassium hydroxide.

17. An alkaline-$MnO_2$ cell employing an aqueous alkaline electrolyte solution and a powder-gel anode comprising a major portion of a consumable zinc anodic material, a minor amount of a starch graft copolymer in which the copolymer contains carboxylate units, and an aqueous alkaline electrolyte solution.

18. The alkaline-$MnO_2$ cell of claim 17 wherein the electrolyte solution is aqueous potassium hydroxide.

19. The alkaline-$MnO_2$ cell of claim 17 or 18 wherein the starch graft copolymer is present in an amount between about 0.6 and about 11% by weight of the anodic material in the cell.

20. The alkaline-$MnO_2$ cell of claim 17 or 18 wherein the starch graft copolymer is present in an amount between about 0.4 and about 6.4% by weight of the total electrolyte solution.

* * * * *